United States Patent
Bidner et al.

(10) Patent No.: US 6,257,214 B1
(45) Date of Patent: Jul. 10, 2001

(54) EXHAUST GAS RECIRCULATION MONITOR

(75) Inventors: David Karl Bidner, Livonia; Douglas Raymond Martin, Plymouth; Michael John Cullen, Northville, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/498,130

(22) Filed: Feb. 3, 2000

(51) Int. Cl.$^7$ .................................................. F02M 25/07
(52) U.S. Cl. ..................................... 123/568.16; 73/117.3
(58) Field of Search ....................... 123/568.16; 73/117.3, 73/118.1

(56) References Cited

U.S. PATENT DOCUMENTS

| | | | |
|---|---|---|---|
| 5,137,004 | * 8/1992 | Takahata et al. | 123/568.16 |
| 5,251,599 | * 10/1993 | Ohuchi et al. | 123/568.16 |
| 5,257,610 | * 11/1993 | Ohuchi | 123/568.16 |
| 5,309,887 | * 5/1994 | Kondo et al. | 123/568.16 |
| 5,317,909 | 6/1994 | Yamada et al. . | |
| 5,331,936 | 7/1994 | Messih et al. . | |
| 5,337,725 | * 8/1994 | Narita | 123/568.16 |
| 5,349,936 | 9/1994 | Uchinami . | |
| 5,474,051 | 12/1995 | Matsumoto et al. . | |
| 5,488,938 | * 2/1996 | Ohuchi | 123/568.16 |
| 5,513,616 | 5/1996 | Matsumoto et al. . | |
| 5,540,091 | * 7/1996 | Nakagawa | 73/117.3 |
| 5,635,633 | 6/1997 | Kadota . | |
| 5,654,501 | 8/1997 | Grizzle et al. . | |

* cited by examiner

Primary Examiner—Andrew M. Dolinar
Assistant Examiner—Arnold Castro
(74) Attorney, Agent, or Firm—Jerome R. Drouillard

(57) ABSTRACT

An EGR system monitor combines an inferred manifold absolute pressure based on measured mass air flow with a measured manifold absolute pressure to obtain a more complete system response during a test procedure involving the opening and closing of the EGR valve.

6 Claims, 4 Drawing Sheets

EXHAUST GAS RECIRCULATION MONITOR

TECHNICAL FIELD

This invention relates to exhaust gas recirculation (EGR) monitoring and, more particularly, to an EGR monitor utilizing both measured and inferred manifold pressure values.

BACKGROUND OF THE INVENTION

Internal combustion engines typically include an EGR system to recirculate a controlled portion of the engine exhaust gas into an engine intake manifold in order to provide a reduction in $NO_x$ emissions. Typically, a control mechanism including an EGR valve is provided to vary the EGR rate according to one or more sensed condition, such as engine temperature, air charge entering the intake manifold, and engine speed.

It is desirable to monitor the operation of the EGR system through onboard diagnostic routines to determine whether or not the system is operating as expected. One approach to EGR monitoring terminates the recirculation of exhaust gas by closing the EGR valve during steady state cruise operation and records the change or difference in manifold absolute pressure (MAP) between the value prior to termination and the value a short time period following termination. The waiting period allows the MAP signal from a MAP sensor to settle. This termination of recirculation is usually commanded several times and the MAP difference signal is averaged. A problem with this approach is that under high load, the manifold pressure does not change significantly between the value sensed with EGR ON (EGR valve open) and the value sensed with EGR OFF (EGR valve closed). Relying on the MAP difference value at high load may cause a false indication of a malfunctioning EGR system.

SUMMARY OF THE INVENTION

The aforementioned problem is solved in accordance with the present invention and an exhaust gas recirculation system monitor is provided wherein a more complete system response is obtained by inferring a manifold pressure value from air flow in the intake manifold as measured by a mass air meter (MAF sensor) and adding an inferred pressure difference value to the actual pressure difference value. The effect of adding the inferred pressure difference value to the measured pressure difference value as determined by the MAP sensor has a complementary effect since at high load the difference between measure air flow with EGR ON versus EGR OFF is significant. The effect is also complementary at low loads since recirculating gas significantly changes manifold pressure but does not significantly change air flow.

DETAILED DESCRIPTION OF PREFERRED EMBODIMENT

Figure 1:
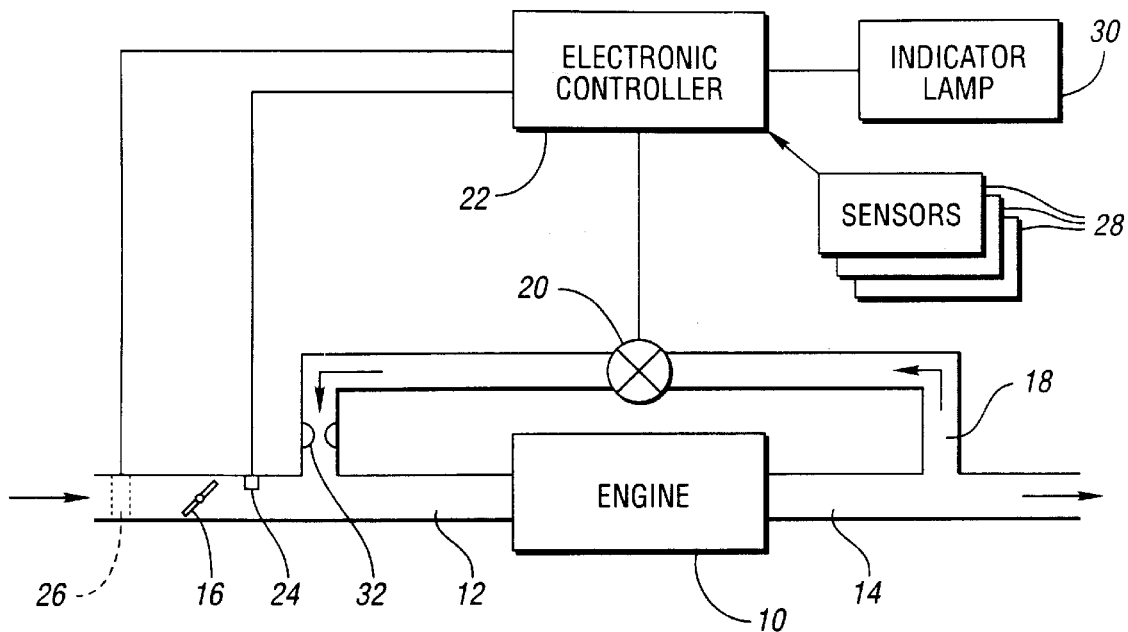
FIG. 1 is a schematic representation of an EGR monitoring system in accordance with the present invention.

Referring now to the drawing and initially to FIG. 1, an internal combustion engine 10 is shown equipped with an intake manifold 12 and exhaust manifold 14. Throttle 16 controls an amount of fresh air admitted to intake manifold 12. A small part of exhaust gas is recirculated via exhaust gas passage 18 to intake manifold 12. The amount of exhaust gas recirculated is controlled by positioning EGR valve 20. The valve 20 may be actuated by a stepper motor, linear solenoid or vacuum actuator which responds to a signal from an electronic engine controller 22. Controller 22 includes the usual CPU, ROM, RAM, KAM and I/O ports to permit the execution of a stored program. A manifold absolute pressure (MAP) sensor 24 is located in the intake manifold 12 and transmits a pressure signal to the controller 22. Mass air flow (MAF) sensor 26 along with an engine speed sensor provides information used for calculating desired EGR flow as a function of engine speed and load. Additional sensors generally indicated at 28, provide information about engine conditions to the controller 22 for processing and controlling various devices as is well known in the art. The controller 22 also controls a fault indicator lamp generally indicated at 30, to notify the vehicle operator of a fault condition and the need for service.

Figure 2A:
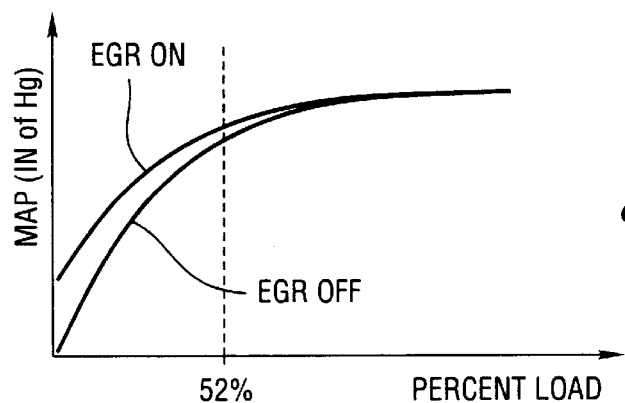
FIG. 2a is a plot of manifold absolute pressure versus load with EGR ON and with EGR OFF.
Figure 3A:
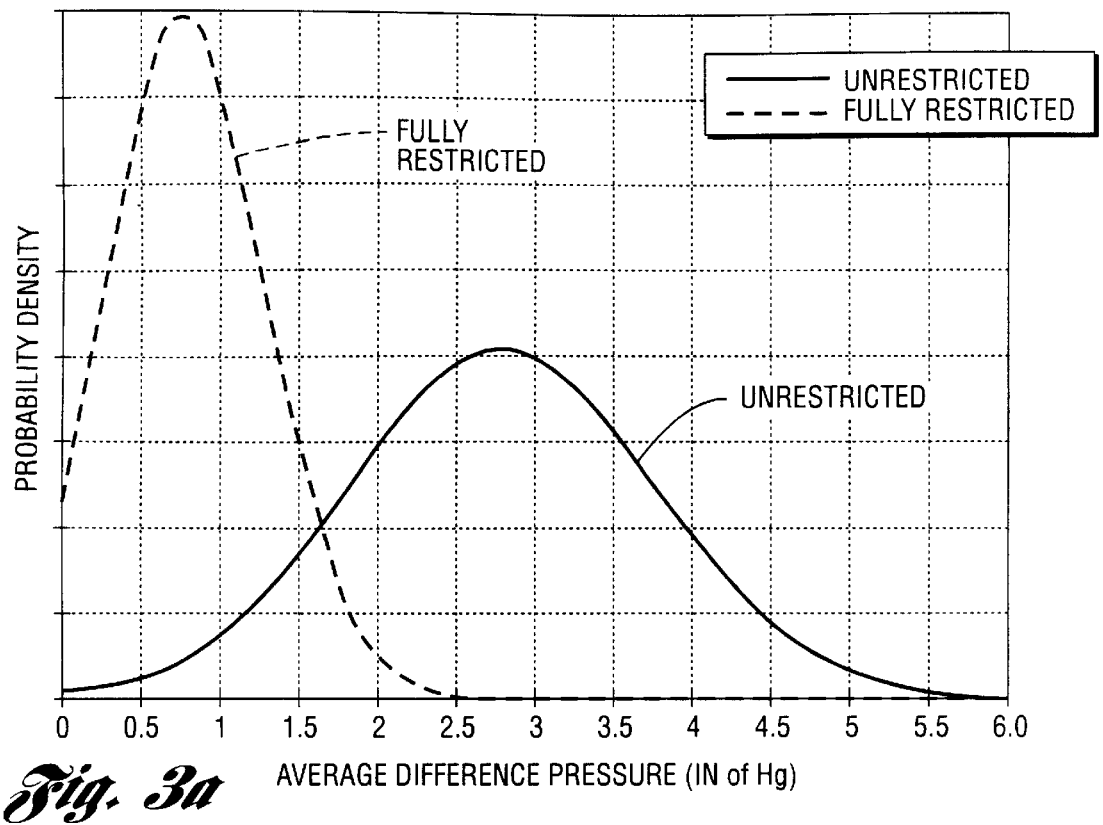
FIGS. 3a is a chart showing the overlap in difference pressure values between a working and non-working EGR system when MAP is the sole source of data.

Condensation of high molecular weight unburned fuel or oil components or byproducts thereof may occur downstream of the valve 20 and lead to blockage of the recirculating gas passage. This is depicted as a narrowing of the passage at 32. If the passage closes sufficiently to produce a difference pressure value that is outside a window of acceptable values then the lamp 30 is energized to warn the operator of a system fault. However, as shown in FIG. 2a as the percent load (MAP/BP) increases, i.e., as manifold absolute pressure (MAP) approaches barometric pressure (BP) the difference in the pressure measured by the MAP sensor 24 with EGR OFF versus EGR ON approaches zero. In other words, at high loads the MAP sensor data alone does not provide an accurate indication of system operability. This is apparent in the chart of FIG. 3a showing the overlap in difference pressure values (Pdiff) between passing and failing EGR systems when MAP is the sole source of data. The "fully restricted" curve is for a failed system, showing the probability distribution of obtaining any given value of Pdiff. The "unrestricted" curve shows the probability of obtaining a given Pdiff for a fully functional system. It can be seen that both working and non-working systems could have values between 0.5 and 2.0 inches of Hg. This problem is further illustrated in FIG. 4a where the variance or noise in the Pdiff data using MAP alone is substantial over the range from an unrestricted to a fully restricted EGR passage.

Figure 2B:
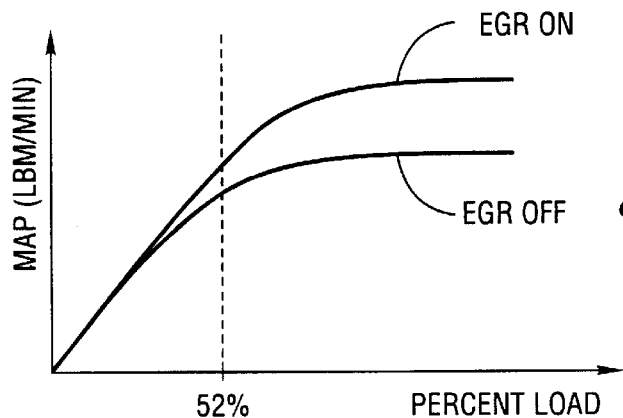
FIG. 2b is a plot of mass air flow versus load with EGR ON and with EGR OFF.
Figure 3B:
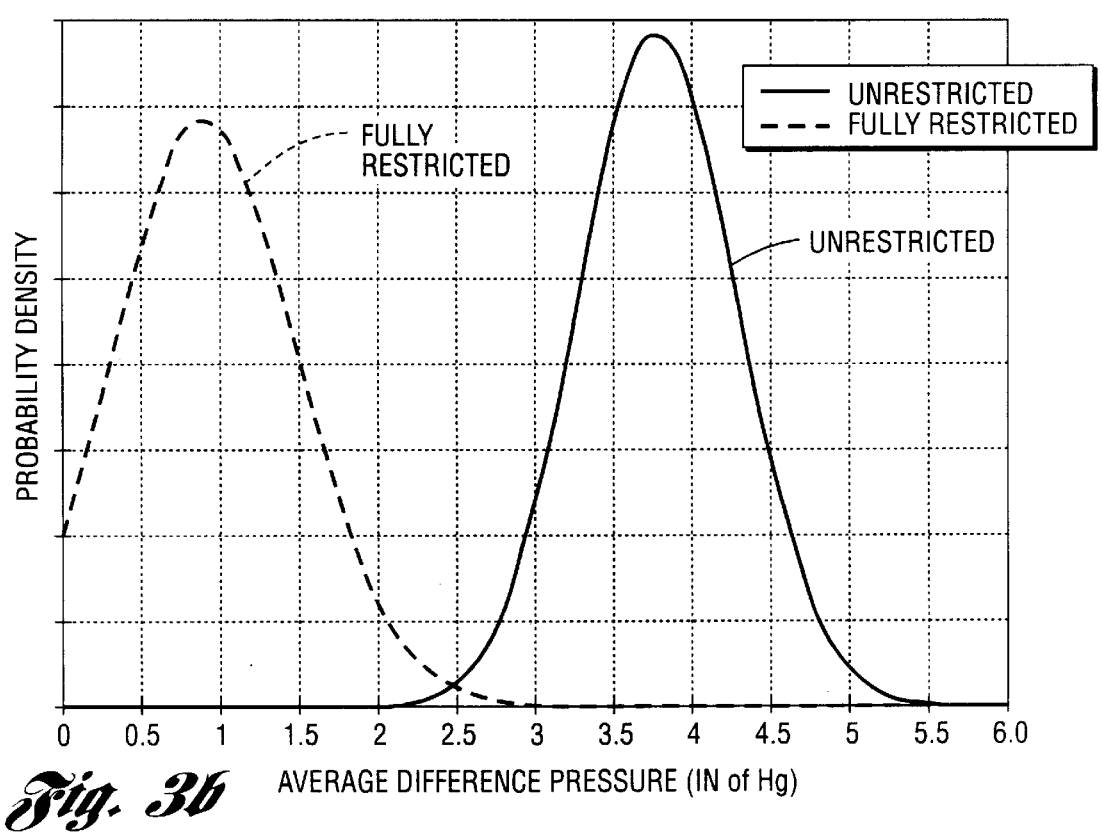
FIG. 3b is a chart similar to that of FIG. 3a showing the improved separation in difference pressure values achieved when MAF data is combined with MAP data as proposed by the present invention.
Figure 4A:
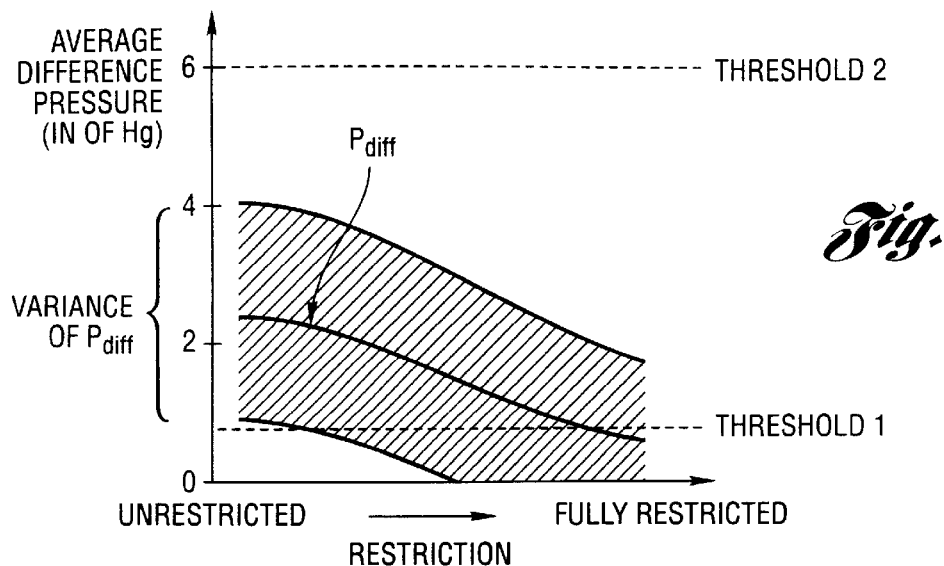
FIGS. 4a, 4b, and 4c show how the difference pressure variance (noise) is reduced by adding a pressure difference inferred from mass air flow to a measured pressure difference.
Figure 4B:
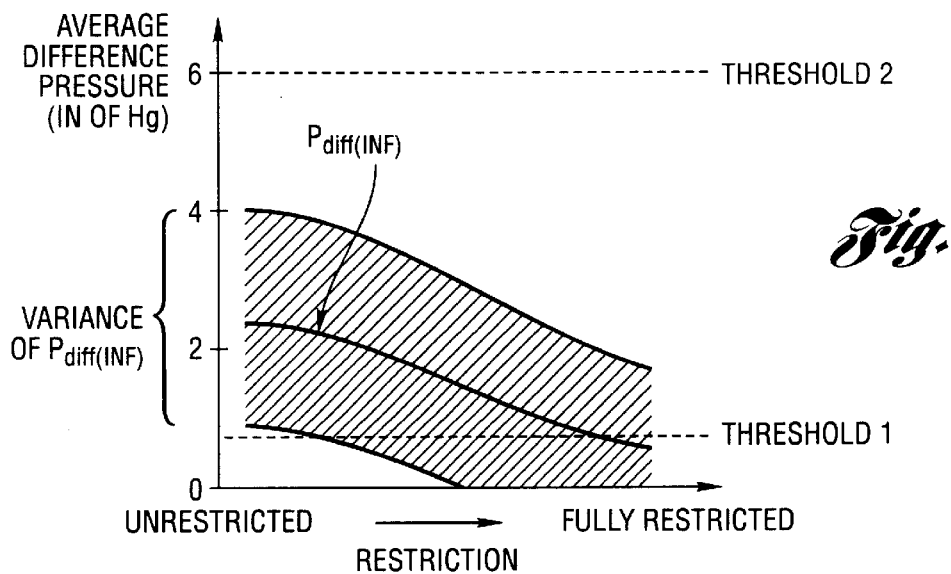
Figure 4C:
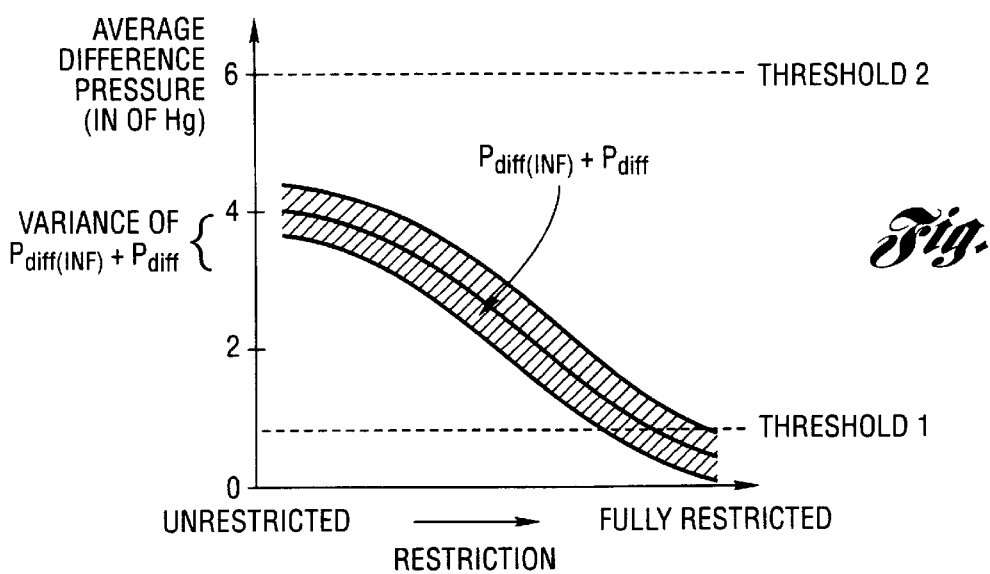

Referring now to FIG. 2b, it will be noted that as the percent load increases the mass air flow measured by the air meter 26 is substantially different for the case where EGR is ON as opposed to the case where EGR is OFF. This characteristic is used to advantage in the present invention. The effect on MAF, of adding EGR to the manifold, is complementary to the effect on MAP. That is, adding EGR under low load changes MAP but does not displace air going through the mass air meter (MAF), while adding EGR under high load does not change MAP significantly but does significantly change MAF. As detailed below, manifold pressure may be inferred from air flow through the meter 26. By adding an inferred difference pressure average value ($P_{diff(INF)}$) obtained from MAF data, to the Pdiff average value obtained from MAP data the overlapping area shown in the chart of FIG. 3a can be substantially eliminated, as shown in the chart of FIG. 3b which depicts the same two curves when $P_{diff(INF)}$ is added to Pdiff. The improved separation between a working and non-working EGR system is a measure of the improvement provided by the monitoring system of the present invention. The reduction in the variance or noise when $P_{diff(INF)}$ of FIG. 4b is added to Pdiff of FIG. 4a is shown in FIG. 4c. The reduction in variance makes it less likely that a false indication of failure will occur from a pressure difference between EGR ON and EGR OFF that is outside the window established by pressure THRESHOLD1 and pressure THRESHOLD2. It should be noted that THRESHOLD2 is unlikely to be exceeded unless there is a bad sensor or very unusual activity in the manifold. Accordingly, it is the lower threshold that is of primary concern and more likely to be breached.

Inferred map may be calculated in accordance with the following equations.

$$egr\_inf\_map=(map\_air\_0+air\_b3\_n*air\_chg/air\_vol\_eff-den\_corr);$$

where: egr_inf_map is inferred MAP ignoring EGR; map_air_0=$f_1$(RPM)*$f_2$(BP). This parameter is MAP at zero air charge and is a function of RPM and a function of barometric pressure. air_b3n =$f_3$(RPM). This parameter is a second function of RPM. It is the slope of manifold absolute pressure vs. air charge obtained from a look-up table based on engine mapping data; air_vol_eff_den_corr=(sqrt(560/(act+460)))*air_vol_eff_corr_tmp). This parameter corrects for cylinder air charge density(act) and Volumetric efficiency and is a background calculation to support a foreground estimate of the pressure inside the intake manifold; air_vol_eff_corr_tmp)=$f_4$(act), $f_5$(ect)). This parameter is a function of two tables, an engine coolant temperature (ect) table and a cylinder air charge density (act) table and corrects for volumetric efficiency to account for differences between mapping conditions and current conditions, essentially due to heat transfer effects; and air_chg is the filtered air charge as disclosed in U.S. Pat. No. 5,331,936, assigned to the assignee of the present invention and incorporated herein by reference.

A method of inferring the pressure in the intake manifold based on mass air flow is also disclosed in U.S. Pat. No. 5,654,501 assigned to the assignee of the present invention and incorporated herein by reference. In U.S. Pat. No. 5,654,501, a pressure correction term is also generated to account for the dynamic response of the air meter.

Figure 5:
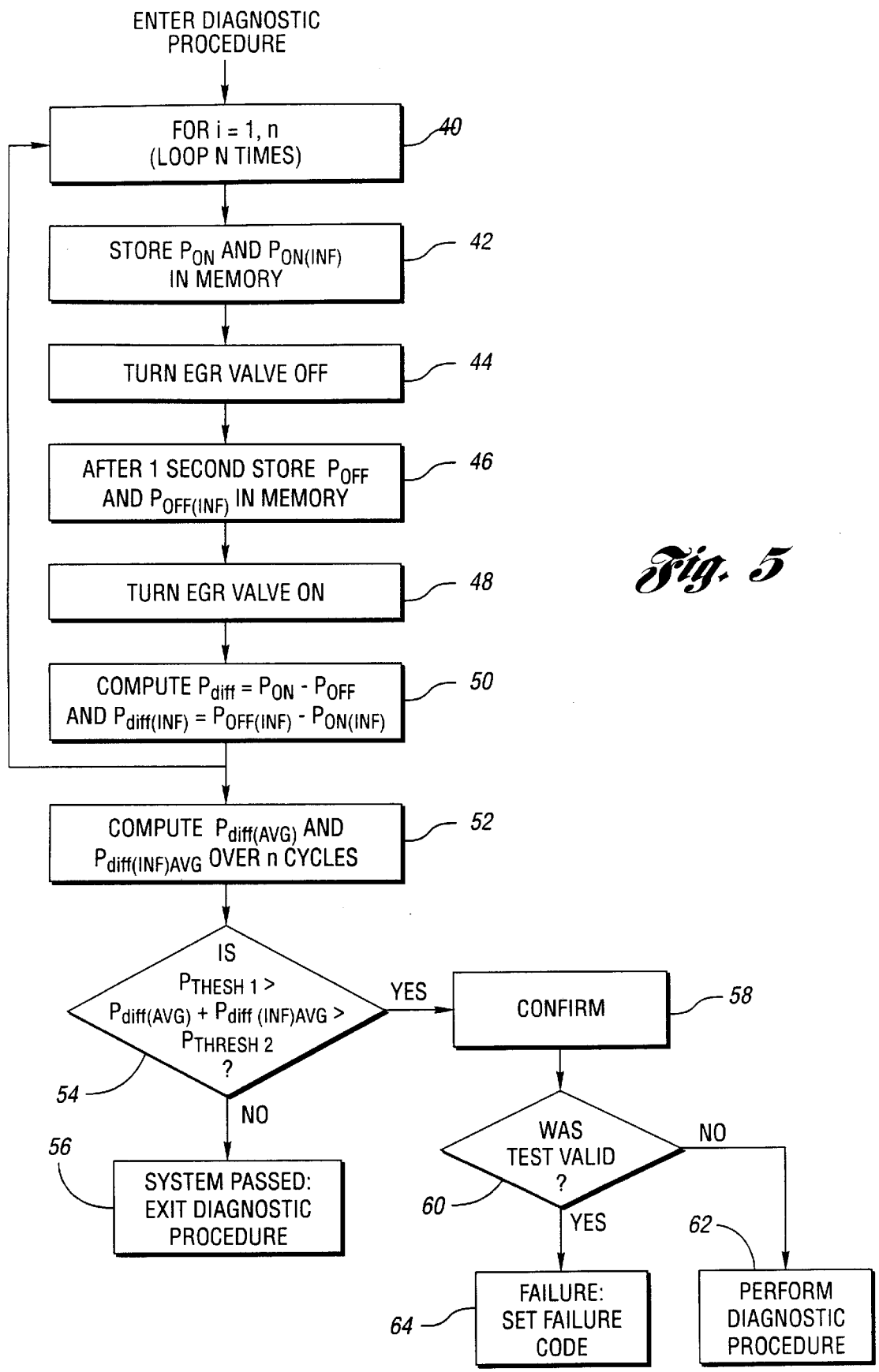
FIG. 5 is a flowchart illustrating a method of implementing the present invention.

A flowchart of a program for monitoring the EGR system is stored in the ROM of controller 22 and is generally disclosed in FIG. 5. The controller determines whether engine conditions are suitable to enter the diagnostic procedure; and if so, the data is collected a number of times as indicated in blocks 40–50 and averaged at block 52. The data $P_{ON}$ is the pressure value obtained from MAP sensor 24 with the EGR valve ON, while the value $P_{ON(INF)}$ is the pressure value inferred from the MAF sensor 26 data with the EGR valve ON. Similarly, $P_{OFF}$ is the pressure value obtained from MAP sensor 24 with the EGR valve OFF, while the value $P_{OFF(INF)}$ is the pressure value inferred from the MAP sensor 26 data with the EGR valve OFF. At block 50, the pressure difference value $P_{diff}=P_{OFF}-P_{ON}$ and the pressure difference value $P_{diff(INF)}=P_{ON(INF)}-P_{OFF(INF)}$ is computed and the average values of $P_{diff}$ and $P_{diff(INF)}$ over n cycles is computed in block 52. If the sum of the average difference pressure values is less than THRESHOLD1 ($P_{THRESH}1$) or greater than THRESHOLD2 ($P_{THRESH2}$), then a failure is identified. If not, then the diagnostic procedure is exited at block 56. If a failure is identified at decision block 54, it must be validated as indicated in blocks 58 and 60 before it is accepted. If engine conditions remained sufficiently constant during the test, then the test is considered valid by decision block 60 and a failure code is set at block 62 and the indicator lamp 30 is illuminated to advise the operator of the failure. If the decision made at block 60 is that the test was not valid, then the diagnostic procedure is performed again as indicated in block 62.

While the best mode for carrying out the present invention has been described in detail, those familiar with the art to which this invention relates will recognize various alternative designs and embodiments for practicing the invention as defined by the following claims.

What is claimed is:

1. A method of monitoring the integrity of an EGR system of an automotive engine having an intake manifold and an exhaust manifold interconnected by an EGR line for recirculating exhaust gas to said intake manifold through an EGR valve located in said EGR line, comprising a sequence of the following steps:

determining first pressure values based on measured manifold absolute pressure and inferred manifold absolute pressure when said EGR valve is open;

determining second pressure values based on measured manifold absolute pressure and inferred manifold absolute pressure when said EGR valve is closed;

determining a difference pressure value based on the difference between said first and second pressure values;

making a decision on the integrity of the EGR system based on said difference pressure value.

2. The method of claim 1 wherein said inferred manifold absolute pressure is based on measured mass air flow to said intake manifold.

3. The method of claim 2 wherein said difference pressure value is the difference between the average of said first and second pressure values over N measurement cycles.

4. The method of claim 2 wherein said difference pressure value is the average of the difference between the sum of measured and inferred pressure values at said open and closed positions; and wherein said decision on the integrity of the EGR system is based on said average.

5. A system for monitoring the integrity of an EGR system of an automotive engine, comprising:

an EGR line interconnecting an intake manifold and an exhaust manifold of said engine for recirculating exhaust gas to said intake manifold through an EGR valve located in said EGR line;

an engine controller for receiving inputs from a plurality of sensors and for positioning said EGR valve to open and closed positions;

an air mass meter for measuring mass air flow to said intake manifold;

an manifold absolute pressure sensor for measuring the pressure at said intake manifold;

said controller storing measured values of pressure from said sensor and inferred values of pressure based on mass air flow from said meter at both said open and closed positions of said EGR valve and computing an average difference pressure value based on the difference between the sum of measured and inferred pressure values at said open and closed positions;

said controller making a decision on the integrity of the EGR system based on said difference pressure value.

6. A method of monitoring the integrity of an EGR system of an automotive engine having an intake manifold and an exhaust manifold interconnected by an EGR line for recirculating exhaust gas to said intake manifold through an EGR valve located in said EGR line, comprising a sequence of the following steps:

measuring manifold absolute pressure and mass air flow in said intake manifold when the EGR valve is open;

measuring manifold absolute pressure and mass air flow in said intake manifold when the EGR valve is closed;

inferring manifold absolute pressure from the measured mass air flow when the EGR valve is open and when the EGR valve is closed;

determining the difference in measured manifold absolute pressure when the EGR valve is open and when the EGR valve is closed;

determining the difference in inferred manifold absolute pressure when the EGR valve is open and when the EGR valve is closed;

averaging the difference in measured manifold absolute pressure over N measurement cycles;

averaging the difference of inferred manifold absolute pressure over said N measurement cycles;

comparing the sum of the values obtained by averaging the measured and inferred manifold absolute pressures with a threshold pressure value in order to make a decision on the integrity of the EGR system.

* * * * *